United States Patent
Arnaud et al.

[11] 3,899,235
[45] Aug. 12, 1975

[54] SLAB-COUPLED OPTICAL WAVEGUIDE

[75] Inventors: Jacques Alexis Arnaud, Colts Neck; Enrique Alfredo José Marcatili, Rumson, both of N.J.

[73] Assignee: Bell Telephone Laboratories, Incorporated, Murray Hill, N.J.

[22] Filed: Mar. 11, 1974

[21] Appl. No.: 449,903

[52] U.S. Cl. ........ 350/96 WG; 350/96 R; 350/96 B
[51] Int. Cl.² ............................................ G02B 5/14
[58] Field of Search ..................... 350/96 WG, 96 C

[56] References Cited
UNITED STATES PATENTS

| | | | |
|---|---|---|---|
| 3,208,342 | 9/1965 | Nethercot | 350/96 WG X |
| 3,760,297 | 9/1973 | Thompson | 350/96 WG X |
| 3,791,715 | 2/1974 | Lean et al. | 350/96 WG |
| 3,813,141 | 5/1974 | Miller | 350/96 WG |

OTHER PUBLICATIONS

Arnaud, "Selection of Waveguide Modes by Two-Dimensional Mode Sinks" Digest of Technical Papers Topical Meeting on Integrated Optics, New Orleans, Louisiana, Jan. 21, 1974, WB12-1 – WB12-4.

Ash et al., "Interconnection of Optical Fibers to Planar Optical Integrated Circuitry", *IBM Technical Disclosure Bulletin*, Vol. 13, No. 9, Feb., 1971, pp. 2529–2530.

*Primary Examiner*—John K. Corbin
*Attorney, Agent, or Firm*—S. Sherman

[57] ABSTRACT

This application describes an optical waveguide comprising an optical fiber having a refractive index $n_2$ and diameter $d$, and a slab of refractive index $n$ and thickness $t$. The fiber and slab are separated by a distance $D$ by means of a dielectric material of refractive index $n_3$, where $n > n_3$ and $n_2 > n_3$. For a given group of materials, the guided modes are determined by the ratio of $d$ to $t$. The loss per unit length for the leaky modes, and the loss experienced by the guided modes as the waveguide is bent in the plane of the slab is a function of $D$.

9 Claims, 7 Drawing Figures

PATENTED AUG 12 1975 3,899,235

SHEET 2

3,899,235

SLAB-COUPLED OPTICAL WAVEGUIDE

This invention relates to optical waveguides.

BACKGROUND OF THE INVENTION

A number of dielectric waveguides of wide potential use in long distance optical transmission and in integrated optics have been described in the literature recently. Among them are the "single-material fibers" ("A New Optical Fiber" by P. Kaiser, E. A. J. Marcatili, and S. E. Miller, *Bell System Technical Journal*, February 1973, pp. 265–269), and the "strip-coupled film waveguide" ("A Novel Optical Waveguide for Integrated Optics" by H. Noda, H. Faruka, and A. Ihaya, Conference on Laser Engineering and Applications, Washington, D.C., 1973). A third waveguide is called a "rib waveguide," ("Rib Waveguide for Integrated Optical Circuits" by J. E. Goell, *J. Applied Optics*, 12, No. 12, December 1973, pp. 2797–2798).

While all of these several waveguide structures have somewhat different shapes and distribution of refractive indices, they have essential elements in common that make them close relatives of the same family of slabcoupled optical waveguides. As members of this same family, however, they share the bad as well as the good features of this type of waveguide. In particular, it is a property of these prior art structures that the losses tend to increase significantly as the guide is bent in the plane of the slab. As such, great care would have to be taken in the laying of optical cable to avoid bends having small radii of curvature.

Thus, it is a broad object of the present invention to reduce the losses incurred in slab-coupled optical waveguides as a result of changes in the direction of wave propagation.

It will also be noted that in all of the prior art waveguides the wave energy is tightly coupled to the slab material. As such, the latter must be made of a high quality material so as to minimize losses.

It is, therefore, another object of the present invention to make the propagation losses of the guided modes less dependent upon the slab material.

SUMMARY OF THE INVENTION

In a slab-coupled waveguide in accordance with the present invention, the guiding strip and the associated slab forming the optical waveguide are physically separated from each other. Thus, the waveguide comprises an optical fiber having a refractive index $n_2$ and diameter $d$, and a slab of refractive index $n$ and thickness $t$. The fiber and slab are separated a distance D by means of a dielectric material of refractive index $n_3$, where $n > n_3$ and $n_2 > n_3$.

The effect of physically separating the fiber and the slab is to decrease the coupling between them. As a result, the field in the slab associated with the guided modes is less than in the prior art related class of waveguides. As a result, the slab can be made of a lower quality (higher loss) material without unduly increasing the attenuation of the guided modes. In addition, the coupling between guided modes and the radiated modes in the slab results in less loss per unit length as the guide is bent in the plane of the slab. Thus, a slab-coupled guide in accordance with the present invention is more tolerant of the quality of the slab and of changes in guide direction.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
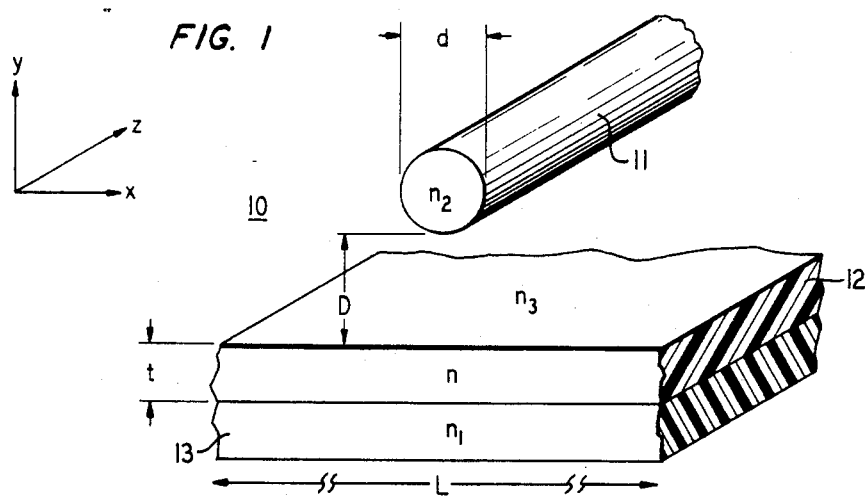
FIG. 1 shows a slab-coupled waveguide in accordance with the present invention.

Referring to the drawings, FIG. 1 shows a slabcoupled waveguide 10 in accordance with the present invention. As shown in its most general form, the waveguide comprises a low-loss dielectric fiber 11, having a refractive index $n_2$ and diameter $d$, and a low-loss dielectric slab 12 of refractive index $n$ and cross-sectional dimensions $t$ and $L$, where $L >> t$.

The slab is physically separated from the fiber by a distance D. The space between them and, in this embodiment, the region surrounding the fiber are occupied by a low-loss dielectric material having a refractive index $n_3$.

The slab, which typically is a thin film of material, is shown resting on a substrate 13 of refractive index $n_1$.

In the most general case, the several refractive indices are unequal but, in all cases, are such that $$n > n_3, \quad (1)$$
$$n_2 > n_3, \quad (2)$$
and
$$n > n_1. \quad (3)$$

Figure 2:
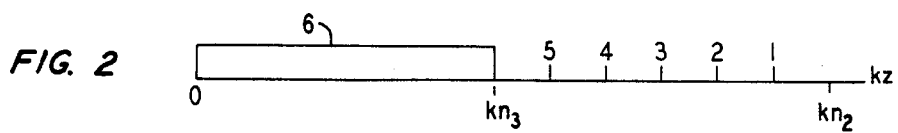
FIGS. 2 and 3 show the modes independently supported by the fiber and the slab of the waveguide shown in FIG. 1.

The modal spectrum of fiber 11, considered by itself (i.e., $D = \infty$), can be computed, and will typically include, as shown in FIG. 2, a number of guided modes whose axial propagation constants $k_z$ lie between a lower value $kn_3$ and an upper value $kn_2$, where $k$ is the free space propagation constant $2\pi/\lambda$. For purposes of illustration, five guided modes 1, 2, 3, 4 and 5, are shown. There will also be a continuum of radiating modes 6 having propagation constants that are smaller than $kn_3$. These, however, are of no present interest. For formulae to calculate fiber modes, see "Weakly Guiding Fibers" by D. Gloge, published in *Applied Optics*, Vol. 10, October 1971, pp. 2252–2258.

Figure 3:
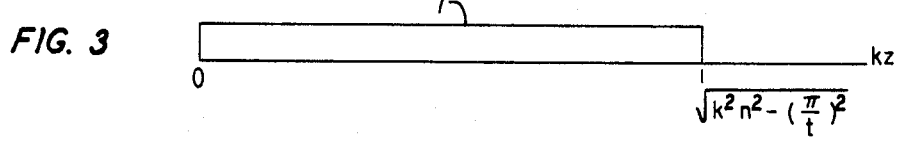

The modal spectrum can also be computed for slab 12. Assuming a slab of infinite width ($L = \infty$), we obtain a continuum of modes 7 with axial propagation constants $k_z$ that range from zero to $\sqrt{k^2 n^2 - (\pi/t)^2}$ provided $kt\sqrt{n^2 - n_1^2} >> 1$. This is illustrated in FIG. 3.

When the fiber and slab are brought into coupling relationship with each other by placing them a finite distance, D, apart, as in FIG. 1, modes with the same propagation constant $k_z$ couple to each other. Therefore, fiber modes 1 and 2, having propagation constants that are larger than the highest slab mode propagation constant $\sqrt{k^2 n^2 - (\pi/t)^2}$, are unaffected. On the other hand, each of the other guided fiber modes 3, 4 and 5 which have a propagation constant that is smaller than $\sqrt{k^2 n^2 - (\pi/t)^2}$ couple to a slab mode within the continuum of slab modes.

Since the slab has a finite width, the equivalent of an infinite slab is obtained by making the slab lossy, either by placing an absorbing material along the slab edges, or by making the edges rough so that light is scattered. As a result, the coupled fiber modes 3, 4 and 5 are attenuated by virtue of their coupling to the slab modes. Only fiber modes 1 and 2 remain practically unaffected by the presence of slab 12.

The smaller the spacing D between the fiber and the slab, the tighter the coupling and, consequently, the higher the attenuation per unit length experienced by the leaky modes. Thus, it is apparent that by adjusting the thickness $t$ of the slab, and the spacing D between the fiber and the slab, the number of lossless modes that continue to propagate in the fiber, and the rate at which the coupled modes are attenuated can be controlled.

Since the propagation constants of the fiber modes are a function of the fiber diameter, and the upper limit of the continuum of slab modes is a function of the slab thickness, the number of guided modes in a slab-coupled waveguide can be readily controlled by appropriately proportioning the fiber diameter and the slab thickness. For example, if the slab thickness $t$ is greater than 0.61 times the fiber diameter, all the fiber modes are coupled to the slab and there is no guided, lossless mode. Single mode propagation is obtained when $$0.4d < t < 0.61d. \qquad (4)$$

Figure 4:
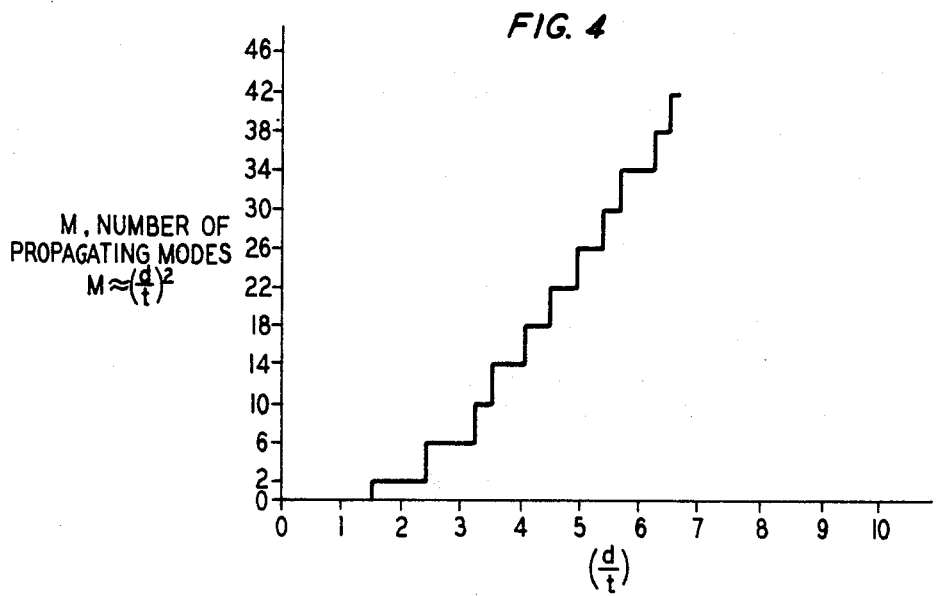
FIG. 4 is a plot showing the relationship between the waveguide dimensions and the mode order of the guided modes.

FIG. 4 is a plot showing the propagating modes as a function of the ratio of the fiber diameter $d$ to the slab thickness $t$.

It was indicated hereinabove that one of the limitations of the prior art was the high loss encountered as the waveguide is bent in the plane of the slab due to the tight coupling between the fiber and the slab. The reason for this can be readily seen from the following equation (5) which relates the loss, in dB, for the guided modes as a function of the spacing, D, between the fiber and the slab:

$$\text{Loss} = K(\rho)e^{-kD} \qquad (5)$$

where $K(\rho)$ is a function of the radius of curvature; and $k$ is a constant.

As can be seen, for the tightest coupling, $D = 0$, the loss is a maximum. As D increases, the losses, for a given radius of curvature, decrease.

Figure 5:
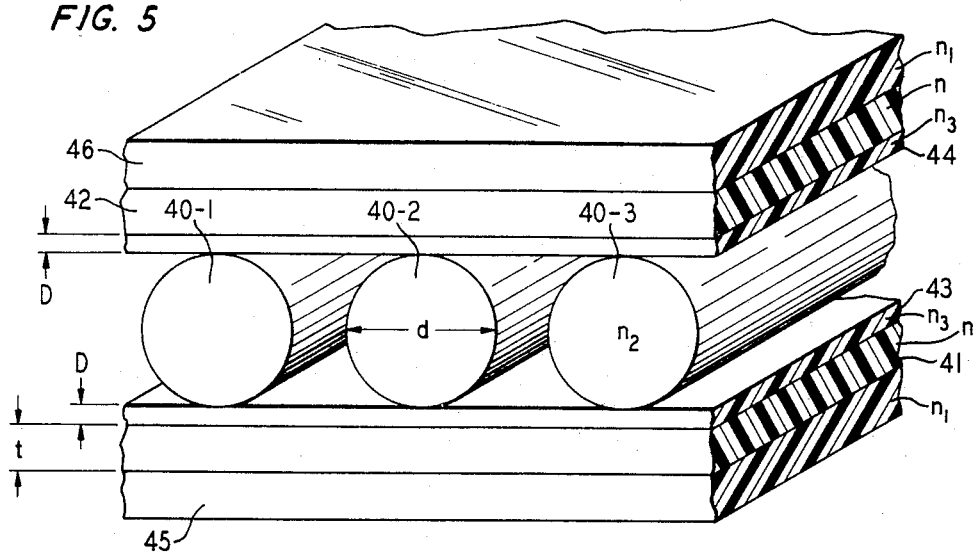
FIGS. 5, 6 and 7 show three optical waveguide arrangements incorporating principles of the present invention.
Figure 6:
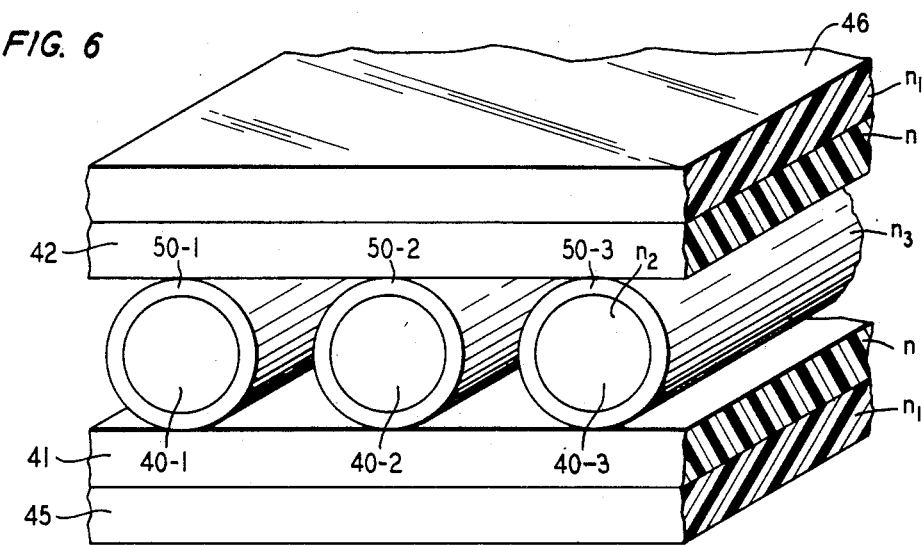

FIGS. 5 and 6, now to be considered, show two fiber ribbons incorporating the principles of the present invention. In the embodiment of FIG. 5, a plurality of fibers, of which three, 40-1, 40-2, and 40-3, are shown, are sandwiched between two slabs 41 and 42 forming a symmetrical waveguide structure. The fibers are supported by, and are in contact with thin layers 43 and 44 of cladding material which are deposited on slabs 41 and 42, respectively. Recognizing that it is in the region immediately between the fibers and the slabs that the coupling takes place, it is only the material placed therebetween that is important in terms of the operation of the fiber. Hence, it is not necessary to completely surround the fibers with cladding material. The cladding thickness D is defined by the consideration explained hereinabove.

Outer layers 45 and 46, corresponding to substrate 13, form a protective outer jacket for the waveguiding assembly.

The embodiment of FIG. 6 is essentially the same as FIG. 5 except that in the instant embodiment each of the fibers 40-1, 40-2 and 40-3 is individually clad. Thus, the cladding layers 43 and 44 are replaced by the individual fiber claddings 50-1, 50-2 and 50-3 of thickness D.

In the most general case, the various materials used in the above-described embodiments can have any appropriate refractive index consistent with the limitations set forth in equations (1) and (2). In a preferred embodiment the slab and the fiber core are made of the same material so that their refractive indices are equal ($n = n_2$). Similarly, the cladding and substrate are made of the same material so that $n_1 = n_3$. However, it should be noted once again that in the slab-coupled waveguide the number of guided modes is determined primarily by the relative dimensions of the waveguide components and not by the refractive indices of the materials.

It will be recalled that the modes coupled to the slab are dissipated in the slab. Since the slab is of finite width, L, rather than infinite, a loss mechanism is provided either by leaving the slab edges unpolished, so as to scatter the slab guided wave energy, or by the inclusion of a separate absorbing material along the slab edges. The nature of the loss mechanism and the spacing D between the slab and the fiber determine the loss per unit length of waveguide, and the minimum permissible radius of curvature of the waveguide.

Figure 7:
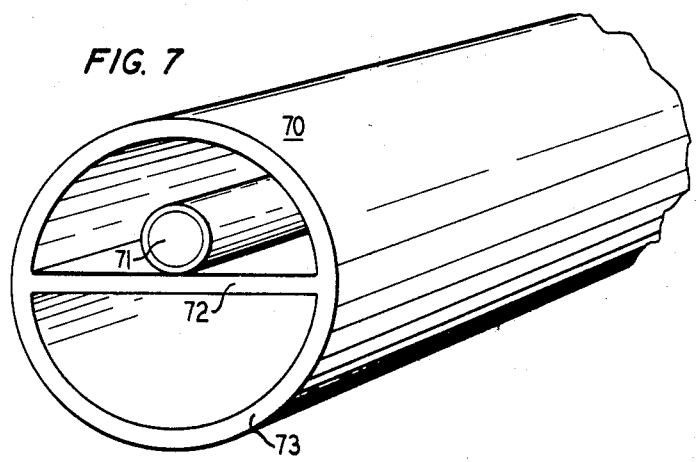

FIG. 7 shows another slab-coupled optical waveguide 70 in accordance with the present invention comprising a clad optical fiber 71 centrally located on a slab 72. The slab is supported within a hollow dielectric cylinder 73. This structure will be recognized as a modification of the single material waveguide described in the above-identified article by Kaiser et al. Specifically, in the instant case, the fiber core and the slab are separated by the fiber cladding for the reasons set forth hereinabove. The regions between the slab and the surrounding jacket are filled with a gas, typically air.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A slab-coupled optical waveguide for guiding optical wave energy having a prescribed modal spectrum comprising:

a slab of low-loss dielectric material of refractive index $n$;

a low-loss dielectric fiber having a refractive index $n_2$ spaced a distance D away from said film, where D is greater than zero;

and a third low-loss dielectric material of refractive index $n_3$ disposed between and in contact with said slab and said fiber, where $n > n_3$ and $n_2 > n_3$;

CHARACTERIZED IN THAT:

said fiber alone is capable of guiding optical wave energy having said prescribed modal spectrum and other unwanted modes;

and in that said slab alone is capable of guiding said unwanted modes but is incapable of guiding optical wave energy having said prescribed modal spectrum.

2. The waveguide according to claim 1 wherein: said slab is supported within a hollow outer jacket.

3. The waveguide according to claim 2 wherein said outer jacket is made of the same material as said slab.

4. The waveguide according to claim 1 wherein said slab rests on a substrate having a refractive index $n_1$ where $n > n_1$.

5. The waveguide according to claim 1 wherein the transverse cross-sectional dimensions of said slab are $t$ and $L$, where $L$ is measured perpendicular to the distance $D$, and $L \gg t$.

6. The waveguide according to claim 1 wherein the slab edges are lossy.

7. An optical slab-coupled fiber ribbon for guiding optical wave energy having a prescribed modal spectrum comprising:
  a plurality of optical fibers disposed between and spaced apart from a pair of low-loss dielectric slabs;
  said fibers being supported by a dielectric member disposed between and in contact with said fibers and with one side of said slabs;
  and outer dielectric jackets disposed along the other side of said slabs;

CHARACTERIZED IN THAT:
  each of said fibers alone is capable of guiding optical wave energy having said prescribed modal spectrum and other unwanted modes;
  and in that each of said dielectric slabs alone is capable of guiding said unwanted modes but is incapable of guiding optical wave energy having said prescribed modal spectrum.

8. The fiber ribbon according to claim 7 wherein: said fibers are unclad;
  and wherein said dielectric member is a layer of material disposed along said one side of said slabs.

9. The fiber ribbon according to claim 8 wherein:
  each of said fibers is surrounded by a cladding of low-loss dielectric material;
  and wherein said cladding serves as said supporting dielectric member.

* * * * *